United States Patent [19]

Suzuki et al.

[11] Patent Number: 4,654,741

[45] Date of Patent: Mar. 31, 1987

[54] MAGNETIC DISC APPARATUS WITH LINER THAT AVOIDS BENT EDGES OF MAGNETIC DISCS

[75] Inventors: Toshiyuki Suzuki, Yokohama; Hiroshi Okamura, Ome, both of Japan

[73] Assignee: Kabushiki Kaisha Toshiba, Kawasaki, Japan

[21] Appl. No.: 724,011

[22] Filed: Apr. 17, 1985

[30] Foreign Application Priority Data

Sep. 28, 1984 [JP] Japan .................................. 59-201506

[51] Int. Cl.$^4$ ........................................... G11B 23/04
[52] U.S. Cl. ................................................ 360/133
[58] Field of Search ....................................... 360/133

[56] References Cited

U.S. PATENT DOCUMENTS 4,263,634 4/1981 Chenoweth et al. ............... 360/133

OTHER PUBLICATIONS

Bothun, "Encased . . . Wiper", IBM Tech Disc Bull, vol. 19, No. 12, May 1977, p. 4720.

Primary Examiner—Robert S. Tupper
Attorney, Agent, or Firm—Cushman, Darby & Cushman

[57] ABSTRACT

A magnetic disc apparatus obtained by housing in a cartridge case, a magnetic disc which is obtained by forming a metallic magnetic sheet on a polymer base and liner sheets. The liner sheet which is installed between the magnetic disc and the cartridge case has an outer diameter which is smaller than the diameter of the magnetic disc, and an inner diameter which is greater than the rotational diameter of an index hole that is prepared on the magnetic disc for detecting the rotational position of the disc. By arranging in this manner, a smooth rotation of the magnetic disc can be accomplished by avoiding the contact with liner sheet of the edges on the outer periphery of the disc that were bent at the time the disc was punched from the magnetic recording medium, and of the edges of the index hole that were bent at the time the index hole was punched.

17 Claims, 12 Drawing Figures

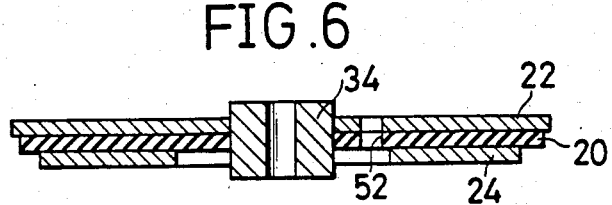
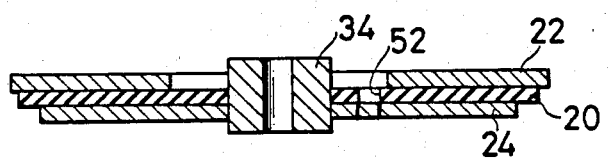
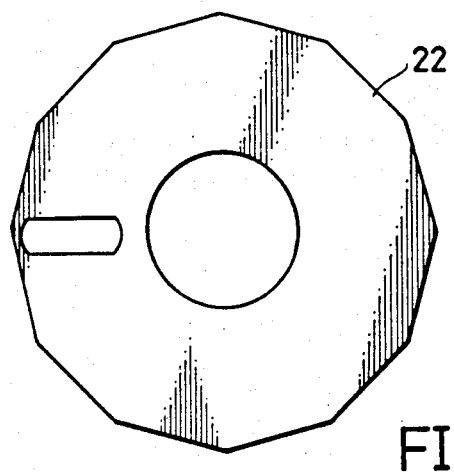
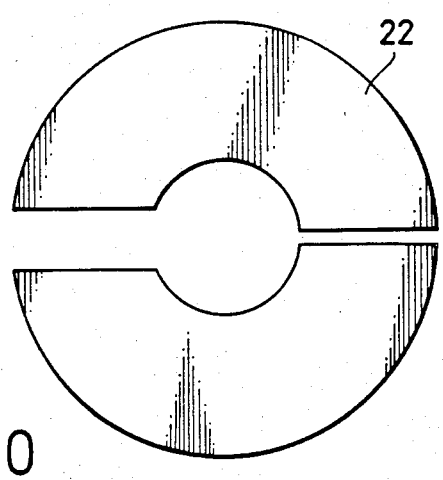
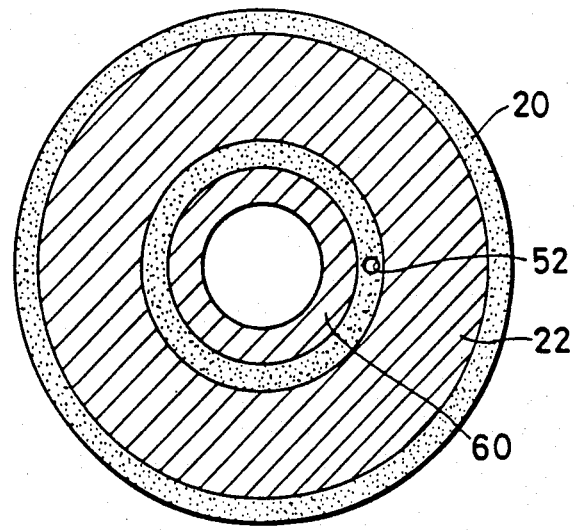

MAGNETIC DISC APPARATUS WITH LINER THAT AVOIDS BENT EDGES OF MAGNETIC DISCS

BACKGROUND OF THE INVENTION

The present invention relates to a magnetic disc apparatus, such as those having a magnetic disc disposed between liner sheets in a cartridge case.

A magnetic disc obtained by forming a magnetic layer on a polymer base is called a floppy magnetic disc which is being used widely as a memory device. A prior art floppy magnetic disc is manufactured by cutting discs from a highly flexible sheet, which is formed by coating magnetic particles such as γ-hematite on a polymer base with an organic binder. The magnetic disc is housed in a flat cartridge case together with liner sheets with a diameter which is equal to or greater than the diameter of the disc.

However, an attempt to increase the recording density of such a prior art magnetic disc is limited due to the magnetic characteristics of its magnetic recording layer. For this reason, new developments have been underway in recent years to form a magnetic layer by sputtering or vapor deposition on a polymer base. The layer includes a film of a metallic alloy such as Co-Cr or Co-Ni-P that has appropriate coercive force and large saturation magnetization. However, such a magnetic disc does not contain a binder in the magnetic layer. Therefore, it has a low flexibility so that the edges tend to bend or crack (rather than cutting cleanly) during the process of cutting to form a disc. The bent edge of the magnetic disc disturbs the smooth rotation of the magnetic disc during its operation since the bent edge catches on the liner sheets in the case. Also, any cracks that were generated at the time of cutting may grow. Furthermore, as the disc is used, small peeled pieces are created which produce scratches through their contact with other parts of the magnetic disc. Moreover, the bent edge creates gaps between the magnetic disc and the liner sheets which locally deform the magnetic disc, so that it results in poor contact between the magnetic disc and the magnetic head, deteriorating recording and reproducing.

SUMMARY OF THE INVENTION

An object of the present invention is to provide a magnetic disc apparatus whose magnetic disc can be driven to rotate smoothly without being adversely affected by bent edges that are generated during cutting of the magnetic disc.

Another object of the present invention is to provide a magnetic disc apparatus which can prevent the growth of cracks that were generated in the vicinity of the cut periphery at the time of cutting the magnetic disc and damage to the magnetic disc that may be caused by the peeled pieces.

A still further object of the present invention is to provide a magnetic disc apparatus in which the magnetic disc intimately contacts the magnetic head.

According to a desirable embodiment of the present invention, a magnetic disc is housed in a cartridge case. The magnetic disc includes a metallic magnetic layer on a polymer base and liner sheets with inner and outer peripheries. The distance between the outer periphery of a liner sheet and the center of the magnetic disc is smaller than the radius of the magnetic disc. Further, preferably, the distance between the inner periphery of a liner sheet and the center of the magnetic disc is greater than the distance between the center of the magnetic disc and the radially outermost point of a small hole (index hole) prepared on the magnetic disc for detecting its rotational position.

BRIEF DESCRIPTION OF THE DRAWINGS

These and other objects and advantages of this invention will become more apparent and more readily appreciated from the following detailed description of the preferred exemplary embodiments of the invention taken in conjunction with the accompanying drawings, in which:

FIG. 6 and FIG. 7 are cross-sectional views that show other embodiments of the present invention; and FIGS. 8, 9 and 10 are other examples of the liner sheet to be used in the present invention.

DETAILED DESCRIPTION OF THE PREFERRED EMBODIMENTS

Figure 1:
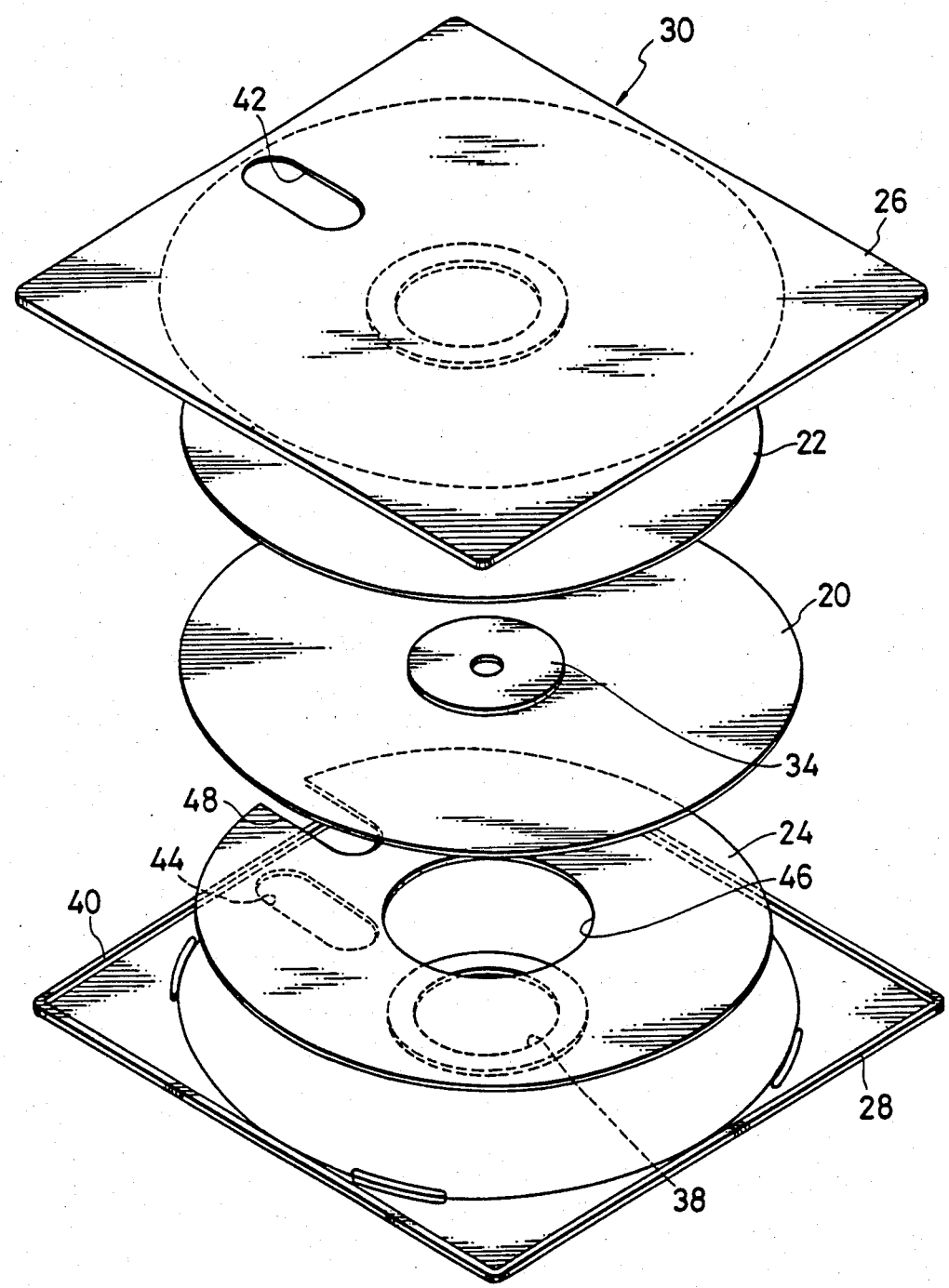
FIG. 1 is an exploded perspective view of an embodiment of the magnetic disc apparatus in accordance with the present invention.
Figure 2:
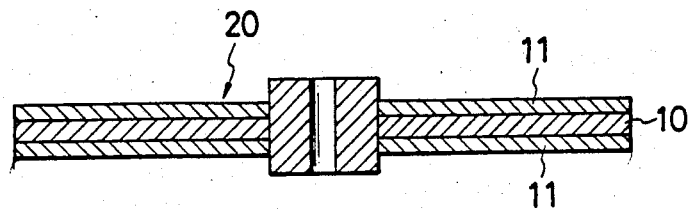
FIG. 2 is a cross-sectional view of the magnetic disc.

As shown in FIG. 1, a magnetic disc apparatus in accordance with the present invention comprises a circular magnetic disc 20, liner sheets 22 and 24, and a cartridge case 30 which is formed by uniting a pair of upper and lower halves 26 and 28 for housing the disc and the sheets. Magnetic disc 20 is obtained, as shown by FIG. 2, by forming a metallic magnetic layer 11 on both surfaces, for example, of a circular polymer base 10. Layer 11 has an appropriate coercive force and large saturation magnetization, such as does Co-Cr or Co-Ni-P. The magnetic disc is formed by punching out a disc shape from a continuously formed metallic magnetic film. The film is ordinarily formed by sputtering or by vapor-depositing the metal on a long sheet-like polymer base. A perpendicular magnetic recording disc (i.e., a disc whose easy axis of magnetization is perpendicular to its surface) may be formed by applying a Co-Cr film to a polymer base. A protective layer and/or a lubricant layer may also be formed on the metallic magnetic layer of the magnetic disc. At about the center of magnetic disc 20 there is formed a circular aperture on which is installed a center core 34.

Upper and lower halves 26 and 28 that constitute cartridge 30 are formed into an approximately square shape from a synthetic resin. At its central part, lower half 28 has aperture 38 which permits insertion of the driving shaft that drives magnetic disc 20. As illustrated in other embodiments to be described below, upper half 26 may also have an aperture. Furthermore, on the circumferences of upper and lower halves 26 and 28 there are formed ribs 40. Case 30 with inside space for containing magnetic disc 20 and liner sheets 22 and 24 is formed by uniting halves 26 and 28 in the state in which the tips of ribs 40 are intimately in contact. On upper half 26, an oblong hole 42 has its major axis along the radial direction of magnetic disc 20. An oblong hole 44 on lower half 28 corresponds to oblong hole 42. Oblong holes 42 and 44 are the apertures for inserting the head. Thus, oblong hole 44 is used, for example, for inserting a lower head and oblong hole 42 is used for inserting an upper head.

Figure 3A:
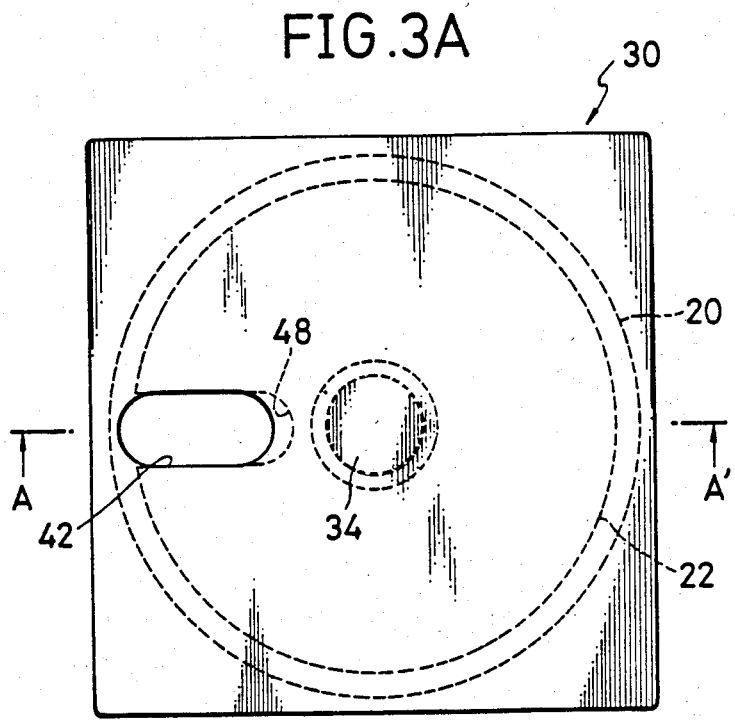
FIGS. 3A and 3B are the plan view and a cross-sectional view along A—A', respectively, of the magnetic disc apparatus shown in FIG. 1.
Figure 3B:
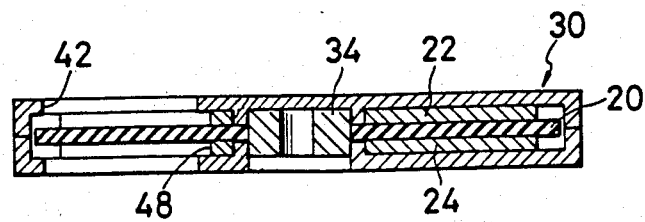

As mentioned above, between upper half 26 and magnetic disc 20 and between lower half 28 and magnetic disc 20 liner sheets 22 and 24, respectively, are inserted. Liner sheets 22 and 24 are made, for example, of nonwoven fabric and allow smooth rotation of magnetic disc 20 inside case 30. Liner sheets 22 and 24 have a circular aperture 46 for inserting the driving shaft for magnetic disc 20 and an oblong hole or notch 48 for inserting the magnetic head. Furthermore, liner sheets 22 and 24 are formed, as shown particularly clearly in FIGS. 3A and 3B, with their outer diameter smaller than the diameter of magnetic disc 20. The term "outer diameter" means the separation between two points that are diametrically situated on the outer periphery of sheet liners 22 and 24. In other words, the distance between the outer periphery of liner sheets 22 and 24 and the center of the magnetic disc 20 is smaller than the radius of magnetic disc 20. This arrangement avoids the coincidence or overlapping of the outer periphery of magnetic disc 20 and the outer peripheries of liner sheets 22 and 24.

It should be mentioned that the foregoing description relates to the use of the present invention in a "double-sided recording type disc" that allows recording/reproducing on both sides of the disc. However, it is possible within the scope of this invention to form a magnetic recording layer on one side of the disc alone, for example, only on the lower surface of disc 20 in FIG. 1. In such a case, oblong hole 44 is used for inserting the head and oblong hole 42 is used for inserting a pad.

In addition, on the magnetic recording layer there may be formed a protective layer made of $SiO_2$, $Al_2O_3$, $Si_3N_4$, or the like, and beneath the magnetic recording layer there may also be formed a soft ferromagnetic layer.

With the above magnetic disc apparatus in accordance with the present invention, the outer diameter of the liner sheets is smaller than the outer diameter of the magnetic disc, and hence, the bent edges that were generated in the outer periphery of the disc when the magnetic disc was cut will not contact the liner sheets, so that it is possible to drive the magnetic disc smoothly. Furthermore, since the liner sheets do not contact the outer periphery of the disc, cracks in the outer periphery of the discs, that were generated when the magnetic disc was cut will not grow and no new cracks will be created. Moreover, there will occur no damage to the magnetic disc which may be caused due to dancing, between other parts of the magnetic disc and the liner sheets, of peeled pieces that are created through contact of the bent edges with the liner sheets. In addition, according to the present invention, it is possible to solve the problem related to contact between the head and the magnetic disc which is caused by the bent edges creating gaps between the magnetic disc and the liner sheet that eventually deform the magnetic disc locally.

It is to be noted that stable running of the magnetic disc will not be disturbed to any degree whatsoever by choosing the outer diameter of the liner sheets to be slightly smaller than the outer diameter of the magnetic disc.

Figure 4:
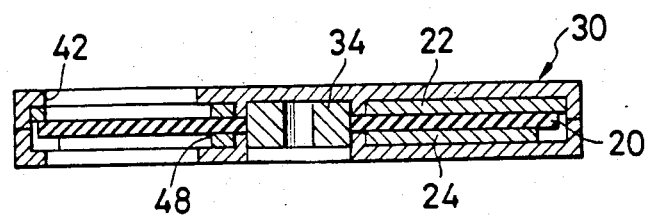
FIG. 4 is a cross-sectional view of another embodiment of the present invention.

FIG. 4 shows another embodiment of the present invention. The outer periphery of the disc tends to be bent during cutting in only one direction depending on what side the sheet was cut. Therefore, the same effects as described above become attainable by choosing the outer diameter of only liner sheet 24, of the two liner sheets 22 and 24, on which side the bent edges occur, to be smaller than the diameter of magnetic disc 20.

Figure 5A:
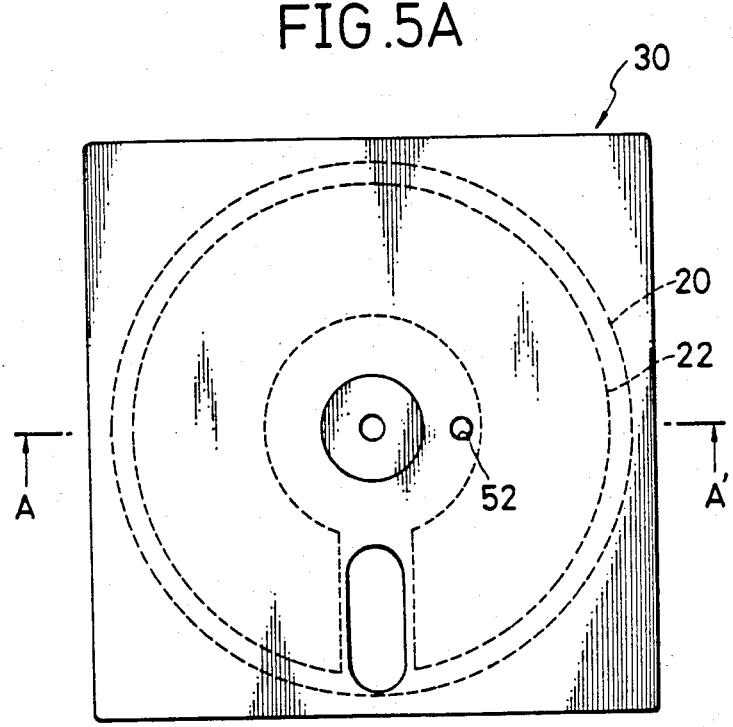
FIGS. 5A and 5B are the plan view and a cross-sectional view along A—A', respectively, of still another embodiment of the present invention.
Figure 5B:
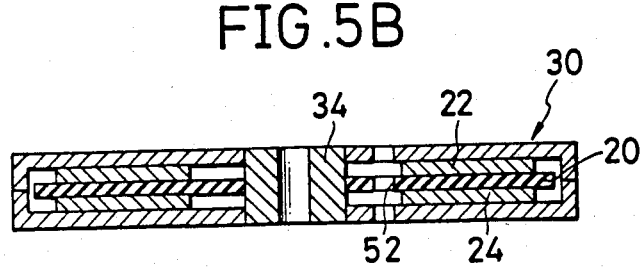

On the magnetic disc, ordinarily a small hole called an index hole for detecting the rotational position of the magnetic disc is located in the area near the center of the magnetic disc and outside of the region for information recording. Therefore, bent edges are generated not only around the outer periphery of the disc, but also around the edge of the index hole. It is clear that the bent edges around the index hole bring about similar problems as caused by the bent edges around the outer periphery of the magnetic disc. Therefore, as shown in FIG. 5, it is effective to install, between magnetic disc 20 and cartridge case 30, liner sheets 22 and 24 that have an inner diameter which is greater than the diameter of the circle defined by the rotation of index hole 52. In other words, the distance between the inner periphery of the liner sheet and the center of the magnetic disc should be greater than the distance between the center of the magnetic disc and the radially outermost point of the index hole. Also, as discussed above, the distance between the outer periphery of the liner sheet and the center of the magnetic disc should be smaller than the radius of the magnetic disc.

When the magnetic disc itself and the index hole are punched in the same direction, the edges that are generated at the outer periphery of the magnetic disc and around the index hole section tend to be bent in the same direction (the direction in which punching occurs). Therefore, the same purpose will be achieved, for example, when the magnetic disc and the index hole are punched in the direction from the top to the bottom, as shown by FIG. 6, by arranging for liner sheet 24 alone, of the two liner sheets 22 and 24, in whose direction bent edges are generated, to have an inner diameter which is greater than the rotational diameter of position detection hole 52, and an outer diameter which is smaller than the diameter of magnetic disc 20.

When the magnetic disc and the index hole are punched from opposite surfaces, edges at the outer periphery of magnetic disc 20 are bent in a direction opposite to the edges around index hole section 52. In the case, for example, when the magnetic disc is punched in the direction from top to bottom, while the index hole is punched in the opposite direction, the liner sheets may be formed in the following manner shown in FIG. 7. Namely, liner sheet 22 may be formed to have an outer diameter which is the same as or larger than the diameter of magnetic disc 20, and an inner diameter which is larger than the rotational diameter of index hole 52, in order to avoid the effects of bent edges around index hole section 52. Liner sheet 24 may be formed to have a diameter which is smaller than the diameter of the magnetic disc, in order to avoid the effect of bent edges at the periphery of disc 20.

Moreover, liner sheets 22 and 24 need not have inner and outer peripheries that are circular in form. Thus, for example, they may have the form of a regular polygon with an even number of sides as shown by FIG. 8. In that case, the outer diameter of the liner sheet is defined as the length of a line which joins two diametrically situated vertices on its outer periphery. Similarly, the inner diameter of the liner sheet is defined as the length of a line which joins two diametrically situated vertices on the inner periphery.

Furthermore, liner sheet 22 need not be perfectly annular, and may have, for example, a notch in it, as shown by FIG. 1, or may be divided into a plurality of pieces, as shown by FIG. 9. Moreover, when a liner sheet 22 with an inner diameter which is greater than the rotational diameter of index hole 52 is to be installed, as shown by FIG. 10, there may be installed a second liner sheet 60 with an outer diameter which is smaller than the inner diameter of the ring defined by the rotation of index hole 52.

While the present invention has been described in connection with what are presently considered to be the most practical and preferred embodiments, it is to be understood that the present invention is not to be limited to the disclosed embodiments but on the contrary, is intended to cover various modifications and equivalent arrangements included within the spirit and scope of the appended claims whose scope is to be accorded the broadest interpretation so as to encompass all such modifications and equivalent structures.

What is claimed is:

1. A magnetic disc apparatus comprising:
   a cartridge case;
   a magnetic disc, disposed in said cartridge case and generally lying in a plane, an outer edge of said disc being bent in a direction from said plane;
   at least one liner sheet installed between said magnetic disc and said cartridge case on a side of said disc corresponding to said direction from said plane, the distance between a point on the outer periphery of said at least one sheet and the center of said magnetic disc being smaller than the radius of said magnetic disc so that said at least one liner sheet does not lie proximate said bent edge of said disc.

2. A magnetic disc apparatus according to claim 1, wherein said at least one liner sheet includes a first liner sheet installed on said side between one surface of said magnetic disc and said cartridge case and a second liner sheet installed between the other surface of said magnetic disc and said cartridge case, the distance between a point on the outer periphery of at least said first sheet and the center of said magnetic disc being smaller than the radius of said magnetic disc so that said first sheet does not lie proximate said bent edge of said disc.

3. A magnetic disc apparatus according to claim 2, wherein the distance between a point on the outer periphery of said first sheet and the center of said magnetic disc is smaller than the radius of said magnetic disc and the radius of said second liner sheet is not smaller than the radius of said magnetic disc.

4. A magnetic disc apparatus according to claim 1, wherein said at least one liner sheet defines a notched section for insertion of one of a magnetic head and pad.

5. A magnetic disc apparatus according to claim 1, wherein said at least one liner sheet possesses an outer periphery which is essentially circular.

6. A magnetic disc apparatus according to claim 1, wherein said magnetic disc includes a Co-Cr film which has an axis of easy magnetization in the direction perpendicular to its surface.

7. A magnetic disc apparatus according to claim 1, wherein said magnetic disc includes two metallic magnetic layers and a polymer base therebetween.

8. A magnetic disc apparatus comprising:
   a cartridge case;
   a magnetic disc disposed in said cartridge case and equipped with an index hole for detecting its rotation, said disc generally lying in a plane, an outer edge of said disc and an edge of said index hole being bent in a direction from said plane; and
   at least one liner sheet with an outer diameter and an inner diameter disposed between said magnetic disc and said cartridge case on a side of said disc corresponding to said direction from said plane, the outer diameter of said at least one liner sheet being less than the diameter of said magnetic disc and the inner diameter of said at least one liner sheet being larger than the outer diameter of the ring defined by the rotation of said index hole so that said at least one liner sheet does not lie proximate said bent outer edge of said disc and said bent edge of said index hole.

9. A magnetic disc apparatus according to claim 8, wherein said at least one liner sheet includes a first liner sheet disposed between one surface of said magnetic disc and said cartridge case and a second liner sheet disposed between the other surface of said magnetic disc and said cartridge case, the outer diameter of at least one of said first and second sheets being less than the diameter of said magnetic disc and the inner diameter of at least one of said first and second sheets being larger than the outer diameter of the ring defined by the rotation of said index hole.

10. A magnetic disc apparatus according to claim 9, wherein both of said first and second liner sheets have an outer diameter that is smaller than the diameter of said magnetic disc and an inner diameter that is larger than the outer diameter of the ring defined by the rotation of said index hole.

11. A magnetic disc apparatus according to claim 8, wherein said at least one liner sheet defines a notched section for insertion of one of said magnetic head and pad.

12. A magnetic disc apparatus according to claim 8, wherein said at least one liner sheet possesses an outer periphery and an inner periphery that are essentially circular.

13. A magnetic disc apparatus according to claim 8, wherein said at least one liner sheet has a noncircular form.

14. A magnetic disc apparatus according to claim 8, wherein said at least one liner sheet comprises a plurality of pieces.

15. A magnetic disc apparatus comprising:
    a cartridge case;
    a magnetic disc disposed in said cartridge case and having an index hole for detecting its rotation, said disc generally lying in a plane, an edge of said index hole being bent in a direction from said plane; and
    at least one liner sheet disposed between said magnetic disc and said cartridge case, on a side of said disc corresponding to said direction from said plane, said at least one liner sheet possessing a form in which the length of a line joining a point on the inner periphery of said at least one sheet and the center of said magnetic disc is greater than the length of a line joining the center of said magnetic disc and the outer periphery of a ring defined by rotation of said index hole so that said at least one liner sheet does not lie proximate said bent edge of said index hole.

16. A magnetic disc apparatus according to claim 15, wherein the apparatus further includes a second liner sheet placed within a ring defined by rotation of said index hole.

17. A magnetic disc apparatus comprising:

a cartridge case;

a magnetic disc disposed in said cartridge case and equipped with an index hole for detecting its rotation, said disc generally lying in a plane, and outer edge of said disc being bent from said plane and an edge of said index hole being bent from said plane;

a first liner sheet with an outer diameter and an inner diameter disposed between one side of said magnetic disc and said cartridge case;

a second liner sheet with an outer diameter and an inner diameter disposed between an opposite side of said magnetic disc and said cartridge case;

one of said first and second liner sheets, disposed on a side of said magnetic disc corresponding to a direction said outer edge of said disc is bent, having an outer diameter less than the diameter of said magnetic disc so that said liner sheet does not lie proximate said bent outer edge of said disc;

one of said first and second liner sheets, disposed on a side of said magnetic disc corresponding to a direction said edge of said index hole is bent, having an inner diameter larger than the outer diameter of a ring defined by the rotation of said index hole so that said liner sheet does not lie proximate said bent edge of said index hole.

* * * * *